United States Patent [19]

Gupta

[11] Patent Number: 5,382,779
[45] Date of Patent: Jan. 17, 1995

[54] SHELF PRICE LABEL VERIFICATION APPARATUS AND METHOD

[75] Inventor: Om P. Gupta, Ithaca, N.Y.

[73] Assignee: Digicomp Research Corporation, Ithaca, N.Y.

[21] Appl. No.: 58,426

[22] Filed: May 7, 1993

[51] Int. Cl.$^6$ ............................................. G06K 15/00
[52] U.S. Cl. ................... 235/383; 235/375; 235/378; 235/385; 235/472; 235/494; 364/401; 364/464.01
[58] Field of Search ............... 235/383, 380, 381, 375, 235/378, 385, 462, 472, 494; 364/401, 403, 405, 464.01

[56] References Cited

U.S. PATENT DOCUMENTS

| | | | |
|---|---|---|---|
| 4,373,133 | 2/1983 | Clyne et al. | 235/383 |
| 4,500,880 | 2/1985 | Gomersall et al. | 364/464.01 X |
| 4,521,677 | 6/1985 | Sarwin | 235/383 |
| 4,654,514 | 3/1987 | Watson et al. | 235/383 |
| 5,065,002 | 11/1991 | Tashiro et al. | 235/472 X |
| 5,111,196 | 5/1992 | Hunt | 235/383 |
| 5,172,314 | 12/1992 | Poland et al. | 235/383 |
| 5,241,467 | 8/1993 | Failing et al. | 235/383 |
| 5,311,000 | 5/1994 | Brooks | 235/462 |

FOREIGN PATENT DOCUMENTS 0199252 10/1986 European Pat. Off. ............. 235/383
PCT/US92/-
06992 8/1992 European Pat. Off. .

OTHER PUBLICATIONS

Seideman, T., "Bar Codes Sweep The World" (1993) Invention & Technology, pp. 57-63.
Tokasz, J., (Apr. 19, 1993) "NYPIRG: Scanner bill doesn't add up" Ithaca Journal, p. 3A.
O'Connell, V., (1993), Don't Get Cheated By Supermar Scanners Money, pp. 132-138.

Primary Examiner—Donald Hajec
Assistant Examiner—Esther H. Chin
Attorney, Agent, or Firm—Barnard, Brown & Michaels

[57] ABSTRACT

A price verification method for retail stores using shelf pricing, and apparatus therefor, in which the shelf labels are provided with an extended bar code having the item number and price of the item. A remote unit scans the item number and price, and uses the item number to look up the item in a database which is identical to the store checkout scanner database, and compares the shelf price to the database price. If they are not the same, a new shelf label may be printed immediately. The method and apparatus described herein are easily adapted to allow government inspections of stores for shelf price accuracy. A further embodiment of the invention provides for a portable totalizer with which a shopper can total purchases as they are selected, enabling the shopper to check the scanner at the checkout register.

19 Claims, 5 Drawing Sheets

SHELF PRICE LABEL VERIFICATION APPARATUS AND METHOD

FIELD OF THE INVENTION

The invention pertains to the field of methods and devices for retail price tag generation and maintenance. More particularly, the invention pertains to an improved shelf price label, methods and apparatus for confirming the accuracy of shelf pricing in a retail environment, and for printing replacement shelf price tags for those with incorrect prices.

BACKGROUND OF THE INVENTION

The adoption of the Universal Product Code (UPC) in April 1973 transformed bar codes from a technological curiosity into a business necessity. Before the UPC, every company had its own way of identifying its products. Some used letters, some numbers, some both, and some had no codes at all. Moreover, before the UPC, various bar code systems were in use, all incompatible. After the UPC, any bar code on any product could be scanned and interpreted in every suitably equipped store in the company.

The UPC comprises a twelve-digit bar code which is split into two halves. The first digit is always 0, except for products like meat and produce that have a variable price dependent upon weight, and a few other special types of items. The first five digits after the "0" are the manufacturer's code, the next five are the product code, and the last is a "check digit" used to verify that the preceding digits have been scanned properly. Hidden cues in the structure of the code tell the scanner which end is which, so it can be scanned in either direction.

In certain products such as meat, etc., the first part of the code identifies the type of item (chuck steak, chicken wings, etc.), and the second half gives the price. Books, too, are given the price coding in the second code group, and a part of the ISBN code is appended in another, smaller, code group.

Manufacturers register their codes with the Uniform Code Council (UCC) to get an identifier code for their companies, then register each of their products. Thus, each package that passes over a checkout stand has its own unique identification number.

Standardization made it worth the expense for manufacturers to put the symbol on their packages and for printers to develop the new types of ink, plates and other technology to reproduce the codes with the exact tolerance required. Despite the estimated $200,000 per store cost of scanning equipment, and the potential $200 million annual cost to manufacturers, tests showed the UPC system would pay for itself in a few years.

Once the level of 85% identification of products was reached in the late 1970's, sales of scanner systems took off rapidly. In 1978, less than 1% of all grocery stores had scanners. By mid-1981 the figure was 10%, three years later it was 33%, and today over 60% of all grocery stores in the nation are using checkout scanners. Other types of stores have begun to follow, led by discount chains such as K-mart and Wallmart. (The preceding discussion is adapted from "Bar Codes Sweep the World", *Invention and Technology*, Spring 1993, pp57-63).

Although originally sold as a way of reducing time and errors at the checkout without adding register employees, stores soon discovered that one of the primary sources of savings in the use of the UPC system is that it is no longer necessary for a store to pay an employee to individually tag each and every item in the store. Instead, a single price label is placed on the shelf next to (or under) the items to be sold. This also allows price changes to be made without having to re-tag hundreds of items, and eliminates the possibility of mis-tagged items.

While ideal for the retailer, shelf pricing has its disadvantages from the consumer's point of view. Since there is no price on the item, the checkout scanner (which is working from a central store database of prices) will charge the customer based on the database price, without reference to the shelf price. Unless he or she notes the price from the shelf on each and every item, a consumer has no way of knowing if the shelf price is the price he or she is actually charged at the register.

There may be some reason for consumers to mistrust shelf pricing. According to an article in the *Ithaca (NY) Journal*, recent studies by Information Week claimed that American consumers were overcharged some $2.5 Billion in 1992 ("NYPIRG: Scanner bill doesn't add up", *Ithaca Journal*, Apr. 19, 1993, page 3A), and a study in Money Magazine estimated that scanner errors account for more than half of supermarket profits, giving consumers a 1-in-10 chance of being overcharged on each visit to one of the 30% of stores that routinely overcharge. ("Don't Get Cheated by Supermarket Scanners", *Money Magazine*, Apr., 1993, pp. 132-138)

The *Money Magazine* article (p. 138) indicates that Connecticut exempts stores from a coding law if the store uses computerized shelf pricing. To this inventor's knowledge, the "electronic unit price shelf tags" are, in fact, small electronic readouts under each item in the store which directly display the scanner database price for each item. This is obviously a huge investment for a store, not to mention the time and trouble to reprogram a system when moving items from one shelf to another.

Legislation requiring stores to guarantee the accuracy of shelf prices against scanner prices may be expected in the future. Tompkins County (N.Y.) is currently holding hearings on such a law requiring a 98% accuracy rate, and New York, among other states, is considering it. Stores approve of a scanner accuracy law, since it allows them to continue shelf pricing in the absence of item pricing, but they will need some way of checking the shelf prices to avoid penalties under the law. Having an employee manually check every shelf label against a price list will eliminate some of the gains made by going to shelf pricing in the first place. Also, counties or states will need some way of checking shelf prices against scanner prices to enforce any law which eventually goes into effect.

Watson, et.al., U.S. Pat. No. 4,654,514, recognizes the problem of incorrect shelf prices and the difficulty of keeping them up to date. He solves the problem by eliminating the shelf price and giving the consumer a shelf mounted scanner to scan the UPC on the item, displaying the correct price from a database downloaded from the store host. This system just makes the problem worse, from the point of view of the consumer, since this means no prices are displayed at all, neither on the shelf nor on the item, and the customer must scan every item on the shelf to get price comparisons. The confusion on a busy shopping night can be easily imagined.

Tashiro, et.al., U.S. Pat. No. 5,065,002, provides a portable unit having a bar code reader and printer, which reads bar codes and then prints them. No particular application is disclosed, nor are any characteristics or uses of the bar codes scanned. There is no processing of the data read, no database of prices and no price lookup. Bar codes are scanned by a hand-held scanner wand, stored in the wand, and dumped to the printer for duplication.

SUMMARY OF THE INVENTION

Under the teachings of the invention, each shelf label will be printed with the UPC or other barcoded identification for the product, extended with an additional code group giving the price for the item. A portable verification unit having a scanner is used to scan the label, including the price. The UPC is used to look up the correct price in the store database which is the same as that used by the store's checkout scanners (or a full or partial copy of the database in the portable unit), and the two prices are compared. In the case of an error, a new label bearing the correct price may be printed immediately. Another embodiment of the invention provides for a portable totalizer with which a shopper can total purchases as they are selected, enabling the shopper to check the scanner at the checkout register.

DESCRIPTION OF THE PREFERRED EMBODIMENT

Overview of the Invention

Figure 1:
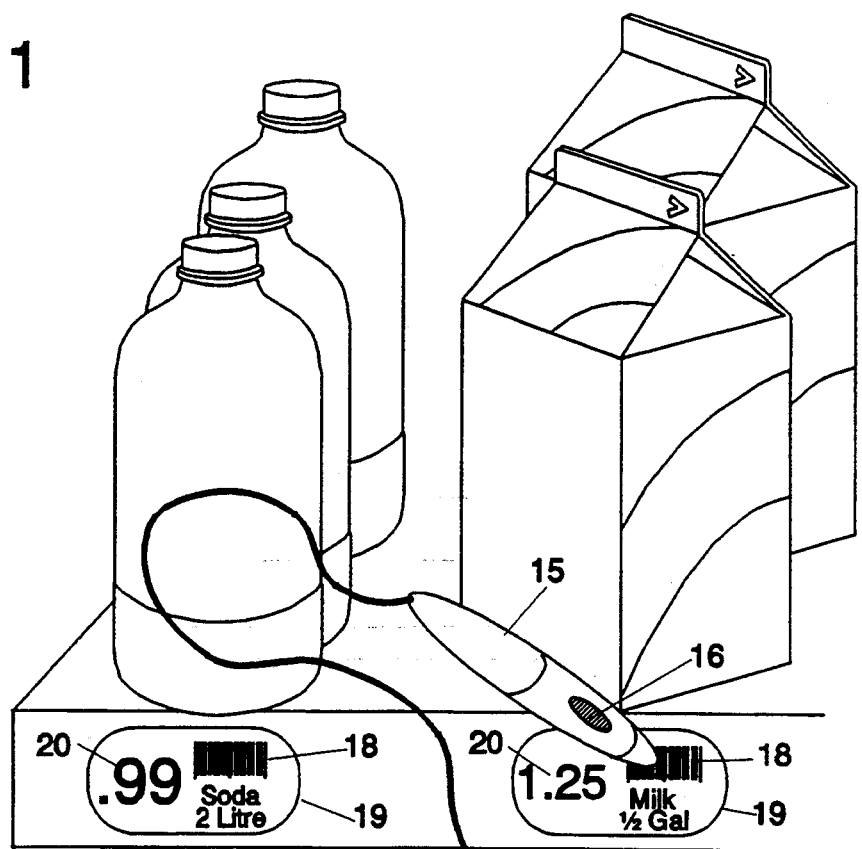
FIG. 1 shows the apparatus of the invention in use, scanning a shelf label.
Figure 1:
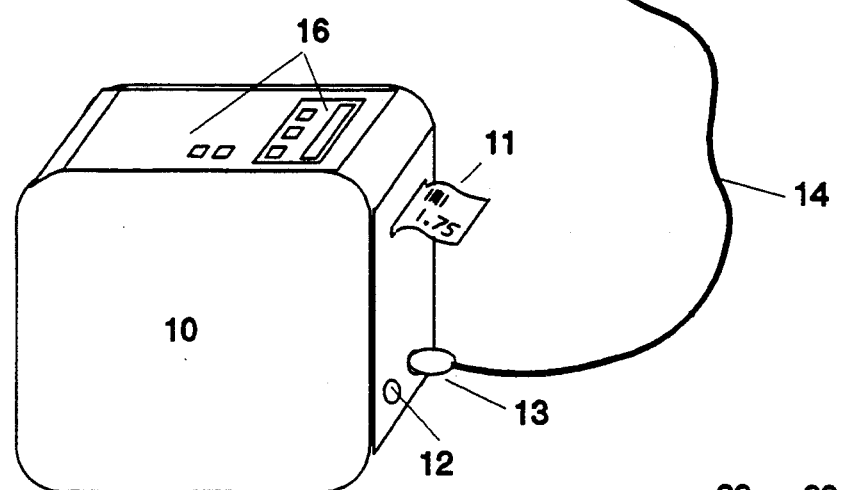

FIG. 1 shows the preferred embodiment of the invention as it might be used in a store.

Two products are shown in the figure, bottles of soda (25) and milk cartons (26), on a representative shelf (27). In front of the products are shelf labels (19). Each label gives the price (20) of the item, in large numbers for the consumer to read. Each label also has a bar code (18), which will be discussed in greater detail below.

The invention is implemented using a portable verification unit (10), which incorporates the various elements necessary to practice the invention. The verification unit may be mounted on or placed in a roll-around cart or shopping cart, or the entire unit could be made small enough to hang over the shoulder of the unit operator on a strap.

Figure 5:
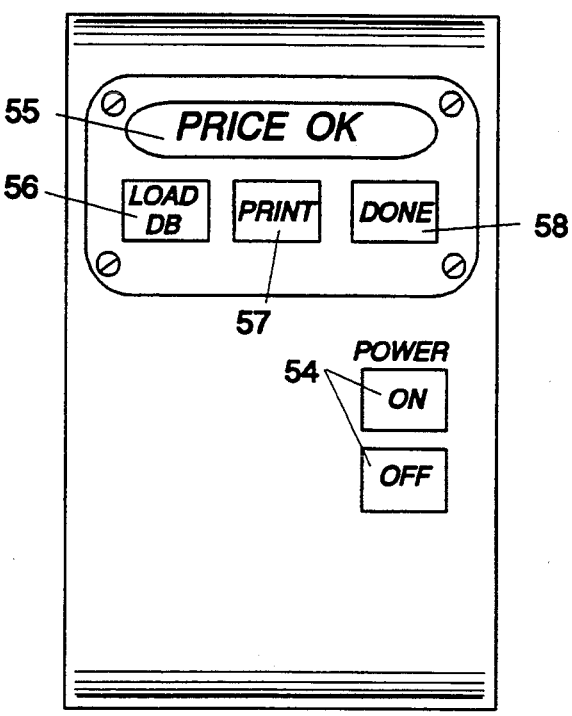
FIG. 5 shows a detail of the top of the apparatus of the invention.

The verification unit (10) has a top panel (16) shown in detail on FIG. 5. The panel (16) has a readout device (55) or indicator which would preferably be of the alphanumeric LCD type which is commonly available from many sources, and requires low power drain and simple, standardized interfacing. However, other display devices such as LED's, gas or plasma discharge, or incandescent, could be used within the teachings of the invention. Since the number of messages to be conveyed would be limited, the readout could be replaced with a number of LED's or indicator lights next to appropriate labels ("Price OK", "Price Error", "Item Not Found", etc.), if desired.

A number of switches, in the form of pushbuttons, will preferably be mounted on the top panel. Shown are buttons for "Load Database" (56), "Print" (57), and "Done" (58), as well as ON/OFF switches (or a single rocker or toggle switch) for system power (54). The use of these switches will become evident later. Switches of many kinds are available, and the choice of type will be obvious to one skilled in the art.

The verification unit will have a printer (11) with paper supply, to allow replacement shelf price labels to be printed if an error is detected. The printer will preferably be built into the verification unit, but it will be understood by one skilled in the art that the printer might be in a separate box and attached to the verification unit by any convenient means such as cables, IR remote, etc. Many kinds of small, low-power printers are available, including thermal, inkjet or inked-ribbon, any of which can be used within the teachings of the invention. The printer must be capable of printing shelf labels or paper slips, including the printing of a bar code which can be read by a scanner. This would not pose a problem with most dot-matrix type printers known today. The printers designed for portable calculators or label makers would be usable within the teachings of the invention. The exact choice of printer for a specific application would be determined by factors of price, power requirements, and the type of label to be printed, all of which would be within the capability of any person skilled in the art.

The verification unit is equipped with two connectors (12) and (13). Connector (12) is for communications with the store's computer, to download the UPC/price database into the verification unit's internal storage. This connector would preferably be one of the industry-standard connectors, such as the 25—pin DB—25, nine-pin DB—9, or one of the five- or nine-pin DIN connectors.

The second connector (13) is for the scanning device, here shown as a wand (15), connected to the main verification unit by a cord (14). In an alternate embodiment, the cord (14) could be replaced by a remote means such as IR or RF, which would allow a larger and heavier verification unit to be mounted on a roll-around cart, with full freedom to the employee doing the sensing, so long as he remained in range of the cart. The scanning device is shown as a wand, which is available from many sources, however one of the scanning guns available on the market could be used instead. The wand is easier to use in this application, as it can simply be run down the shelf in contact with the shelf edge and scanning each label as it passes. The gun would require the employee to aim accurately and "shoot" each label. In some applications, the gun might be preferable, and the exact form of the scanning device can vary within the teachings of the invention.

The wand (15) or gun is preferably provided with a switch (16) or trigger to signal the verification unit that scanning of a label has begun, and thus to start the laser beam for scanning. This switch may be omitted, if desired. The trade-off between use of this switch (16) and continuous scanning would be obvious to one skilled in the art, including such factors as power drain, laser life, dangers from visible laser beams, etc.

Figure 2:
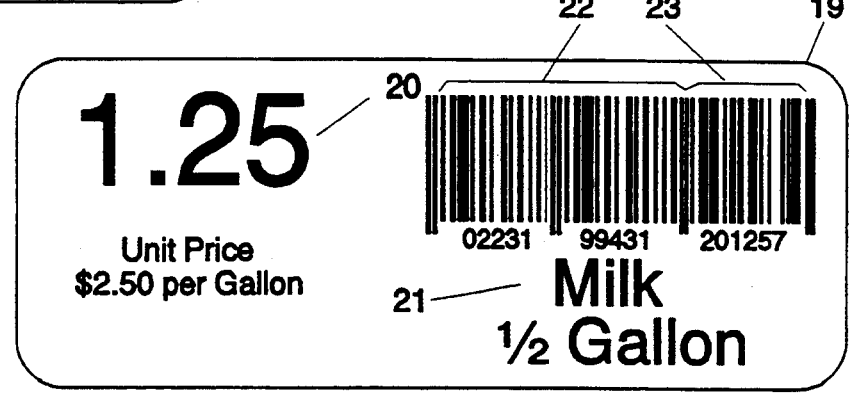
FIG. 2 shows a detail of a shelf label adapted for use with the method of the invention.

FIG. 2 shows a shelf label (19) modified for use with the invention. The label will include pricing information (20) for the customer to read, possibly including a unit price as shown. It will also include a product description (21), so the customer can determine what product the price label refers to. An extended UPC for the product is printed on the label. The standard UPC, identifying the product as described above (22), is followed by an additional barcode group (23) giving the price of the item. Preferably, this additional barcode follows the same format as the price portion of the standard UPC price code used for priced items such as meat or the like, which eliminates the need to define an additional code and uses standard UPC coding and decoding methods.

It should be noted that the exact coding shown in the drawing and described herein is given for example only, and that any scanner-readable coding which gives both the item identification and price will work within the teachings of the invention. The "UPC" bars in FIGS. 1 and 2 of the drawing do not actually relate to the products shown, nor do they form a valid UPC barcode, but are provided for drawing purposes only.

Internal Details of the Apparatus

Figure 3:
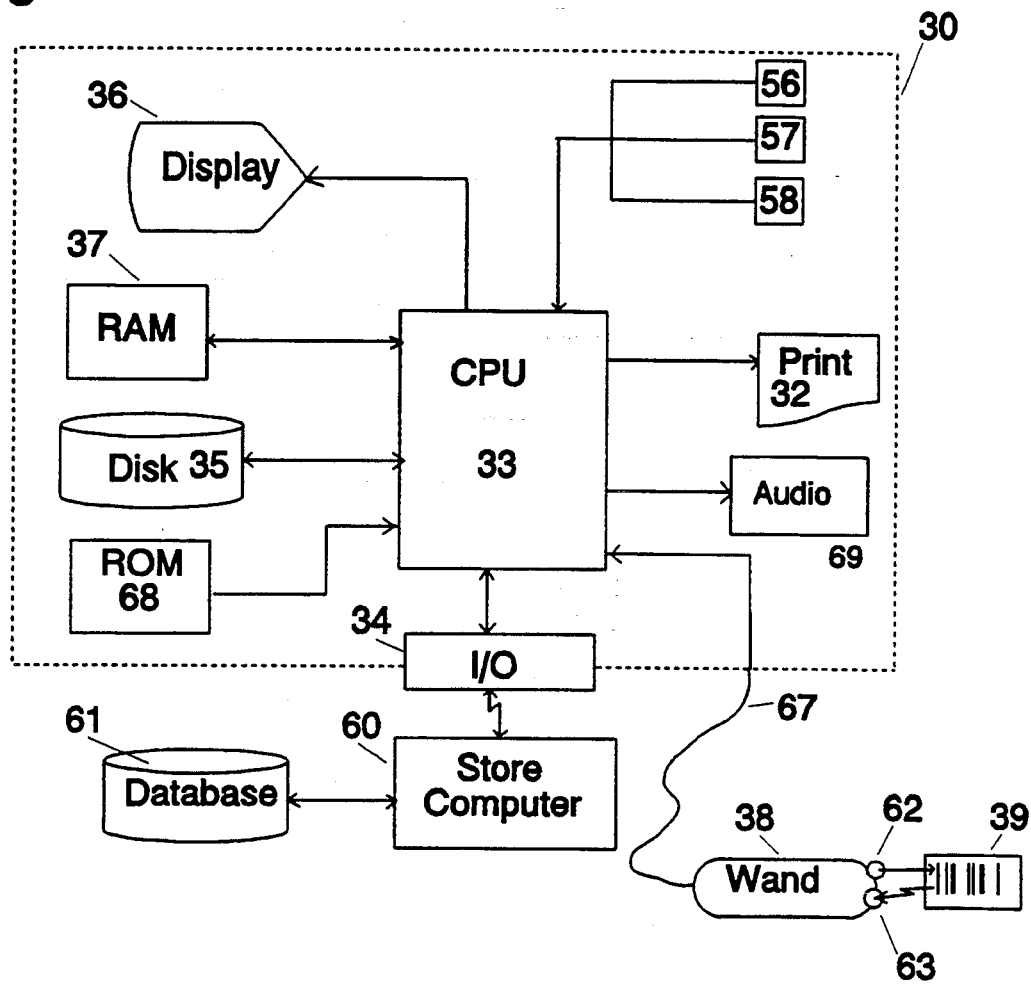
FIG. 3 shows a block diagram of the apparatus of the invention.

Referring now to FIG. 3, the block diagram of the portable verification unit itself is enclosed in dotted lines (30). Not shown is the power supply for the verification unit, which will preferably comprise a rechargeable battery pack of sufficient voltage and amp/hour rating to power the verification unit for several hours. Gelled-electrolyte lead-acid ("Gel Cell") or Nickel-Cadmium (NiCd) batteries would be preferable for this application. The choice of specific power supply will depend on the electronics chosen for the various components in a manner familiar to one skilled in the art.

The verification unit is seen to comprise a CPU (33), which can be any of the many (preferably low power) general-purpose VLSI microprocessor "chips" available, such as the 80C386 or the like. These devices are currently widely used in portable "laptop" computers, and the same advantages which make them well adapted for that application are also important here.

The basic microprogram for the verification unit can be "burned" into Read Only Memory (ROM) in the chip itself, or external ROM (68) can be provided as shown. The ROM (68) contains the programming necessary to allow the CPU to perform the functions required. If desired, the ROM need contain no more code than that necessary to instruct the verification unit to download additional code into the Random Access Memory (RAM) (37) from the store's computer, when the price and identification data is loaded into the disk (35).

The RAM (37) contains the short-term storage needed for the operation of the verification unit, and possibly elements of the CPU programming which are not ROM-resident. Any RAM which will interface with the CPU chosen is usable, and the specific chips chosen will vary based on the processor, the state of the art at the time, power drain, required memory capacity, etc. At the present time, 1 Megabyte CMOS low-drain memory would be the most likely choice.

The "disk" (35) is used to contain the price and product identification information downloaded from the store's main computer. Although called a "disk" in this specification, it will be understood by one skilled in the art that the exact form of this mass storage medium will vary within the teachings of the invention as the technology of portable mass storage evolves. At present, large capacity rotating magnetic disks (on the order of hundreds of megabytes) are relatively inexpensive and easily available. In the future, this may be replaced by solid state memory, optical disks, bubble memory, or some other technology yet to be developed. If desired, large chains might distribute the price database on Compact Disk Read-Only Memory (CDROM), which could either be physically used in the verification unit, or downloaded onto a conventional magnetic or other "disk" in the verification unit.

The information stored in the disk will contain, at a minimum, the UPC key and price for every item to be verified. Preferably, the database will also contain such information as a description of the item, quantity of sale (14-ounce box, ½ gallon bottle, 50-count package, etc.), and standard unit for unit pricing ("each", "ounce", "10-count", etc.), so that all of the information necessary to produce the price label will be immediately available in mass storage. Preferably the data will be stored in some compressed format to save on disk space and transfer/access time.

If the "disk" storage is limited, it will be understood that the database need not contain all of the UPC information for the entire store. By planning how the store is to be checked, the database could be downloaded in sections (i.e. all canned goods, all cereals, dairy/produce, etc.) and the price checking would then be done by section of the store. As a practical matter, this would have little or no effect upon the operation of the system, since stores tend to be arranged in related aisles, and it is most likely that an entire section would be scanned at a time, before moving on to unrelated merchandise. If the store's computer contains such information, the data could specifically be downloaded by aisle or group of aisles.

It is not necessary for the data base to reside in the verification unit, though this is preferred. If desired, the "disk" in the verification unit can be eliminated, and the "I/O" link (34) in FIG. 3 between the verification unit (30) and the store computer (60) would become a remote link, using whatever radio (RF) or infrared (IR) technology is current at the time. For example, the "wireless LAN modem" technology could be used to establish the link, or a duplex simultaneous transmission/reception path on one or more frequencies could be used with conventional 4-wire modems. The operation of the invention would not change, except that the "download database" step (42) of FIG. 4 would not be needed, and the lookup would actually be performed in the store's computer database via the remote link.

The display (36), switches (64), (65) and (66), wand (38), cord (67), and printer (32) were discussed above.

The three switches shown would be used to initiate a database download (56), control the printer (57) and signal that the scanning process is completed (58). Since these switches will merely provide contact-closure signals to the CPU, the exact functions of the switches will be under software control. For example, the "print" switch could be programmed to cycle through a series of print modes, signalled by appropriate messages on the display (i.e., "No Print", "Print Always", "Print on Price Error"). The CPU could be programmed to print a summary on detecting a press of the "done" key, etc.

Other uses for the switches will be evident to one skilled in the art.

The wand (38) or other scanning means will have a light source (62), preferably an IR laser diode for the wand application (a gun would use a higher-power visible laser) which illuminates the bar code (39), and a photodetector (63) to detect the reflected light and thus "read" the code.

Preferably, the verification unit will include an audible alarm (69). This could be simply a speaker driven from a port on the CPU, as is used in the common PC speaker system, or it could be a piezoelectric alarm or "Sonalert" module which are commonly available.

The store computer (60) would most likely be the same computer as now exists to drive the checkout scanners. It maintains the database (61) of information on the products. The I/O interface (34) adapts the verification unit to the store computer in any way convenient to the designer and the computer system. Preferably, this will be an industry-standard serial RS232 or RS-422 interface running at the maximum available baud rate, or a standard bi-directional Centronics parallel interface might provide a higher data rate. The volume of information to be loaded into the verification unit will dictate that the highest possible data transfer rate, perhaps including some compression, be used to minimize the transfer time. If desired, while the data is being downloaded, the internal batteries can be charging.

The preferred embodiment of the invention has been described herein in the form of a specialized apparatus, specially built for the application. However, it will be understood that one skilled in the art could adapt a conventional general-purpose portable computer, such as one of the many "laptop" or "notebook" PCs on the market today, to practice the invention.

Operation of the Invention

Figure 4:
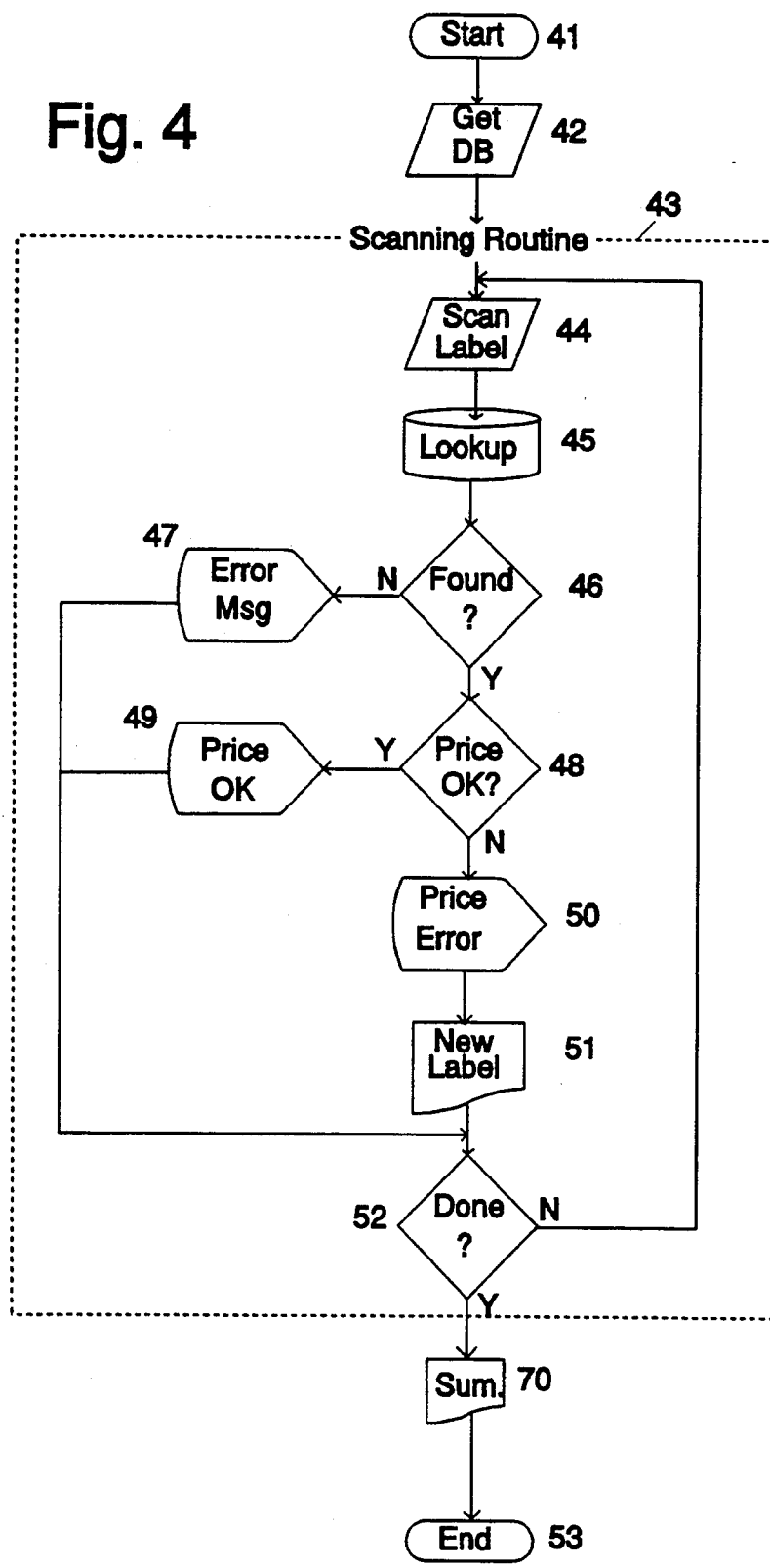
FIG. 4 shows a flowchart of the method of the invention.

FIG. 4 shows a flowchart of the basic operation of the method of the invention. This flowchart is intended to illustrate the basic operation of the invention. Additional variations in the flowchart will be evident to one skilled in the art, and some will be discussed below.

If the system is designed for the correct store price database to reside in the portable verification unit, the operation starts (41) with the download of the database from the store computer (42). This will probably be initiated by plugging the verification unit into the store computer (60), running an appropriate program on the store computer, and pressing the "Load DB" button (56) on the verification unit. When step (42) is complete, the verification unit can display an appropriate message such as "DOWNLOAD COMPLETE" on the display (36).

If a remote data link to the store computer used to control the checkout scanners replaces the internally stored database, then the "download database" step (42) would be replaced by "establish remote link", with the rest of the method proceeding as described below.

The basic scanning routine of the invention is enclosed in dotted lines (43). The operations before and after this routine are shown in summary fashion only, as the exact details of database loading, etc, will vary by the hardware and software being used by the store, within the ability of one skilled in the art.

The scan routine (43) is started when the employee takes the verification unit out into the store to begin scanning. The employee scans a shelf-price label (44) pressing the trigger switch (16) on the wand (15) or gun. This causes the scanning means to read the label, and the UPC (22) and price (23) from the label are decoded by the CPU and loaded into the RAM (37). The CPU then uses the UPC as a key to look up (retrieve) an item record (45) in the database on the disk (35). If the item record is not found (46), the CPU will cause the display to show an appropriate message ("ITEM NOT FOUND") and preferably to emit an audible warning. The routine then falls through to the bottom, where it checks to see if the "done" switch was pressed. If not, it returns to the top and waits for another scan.

If the item record was found (46), the CPU then (48) compares the price scanned from the label (23) to the price from the item record retrieved from the database stored on disk (35). If the comparison indicates that the price is correct, the CPU displays a message to that effect (49). ("PRICE OK"), optionally gives an audible indication, and falls through to the check of the "done" indication (52), as described above.

If the price comparison was not successful (48), the CPU displays (50) an appropriate message ("PRICE ERROR") with optional audible warning, and prints (51) a new label, using the information from the database for the description, units, etc. The printer can be set up to produce the entire label "from scratch", using blank labels or paper. If desired, the printer could also be loaded with pre-printed forms bearing the store's logo, possibly with color accents or advertising material, which would also have the added advantage of making it difficult to forge the price labels.

The employee can then replace the erroneous shelf price label with the newly printed one, and move on to the next label. Meanwhile, the routine proceeds to check the "done" status (52), and returns to wait for another scan, as discussed above.

If the "done" indication (52) is true (i.e. the "done" button was pushed) the routine can simply end, return to the "start" condition ("READY FOR DOWNLOAD"), or print a summary listing of scans and errors (70), or some combination of these.

As discussed above, several print modes could be programmed into the verification unit within the teachings of the invention. The modifications to the flowchart of FIG. 4 for the various modes discussed are simple. The basic flowchart of FIG. 4 shows the "Print on Price Error" mode of operation. To implement the "Print Always" mode, check after the "Price OK" display (49) for the "Print Always" indicator. If true, go to block (51) (Print new label). To implement a "No Print" mode, check for a "no print" indication. If true, then block (51) is bypassed.

Additional Embodiment: Consumer Price Scanner and Totalizer

Figure 7:
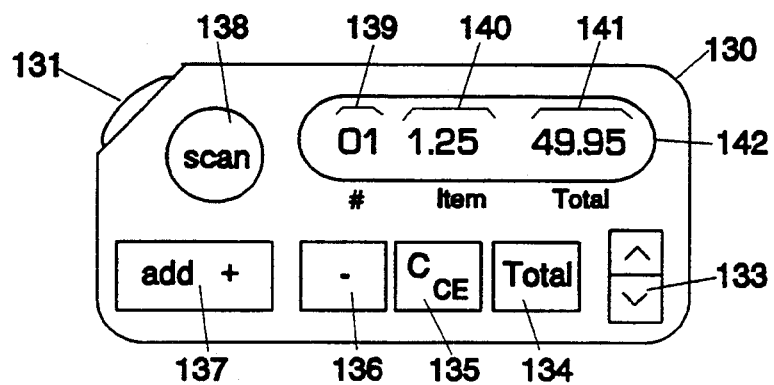
FIG. 7 shows a side view of a hand-held totalizer.
Figure 8:
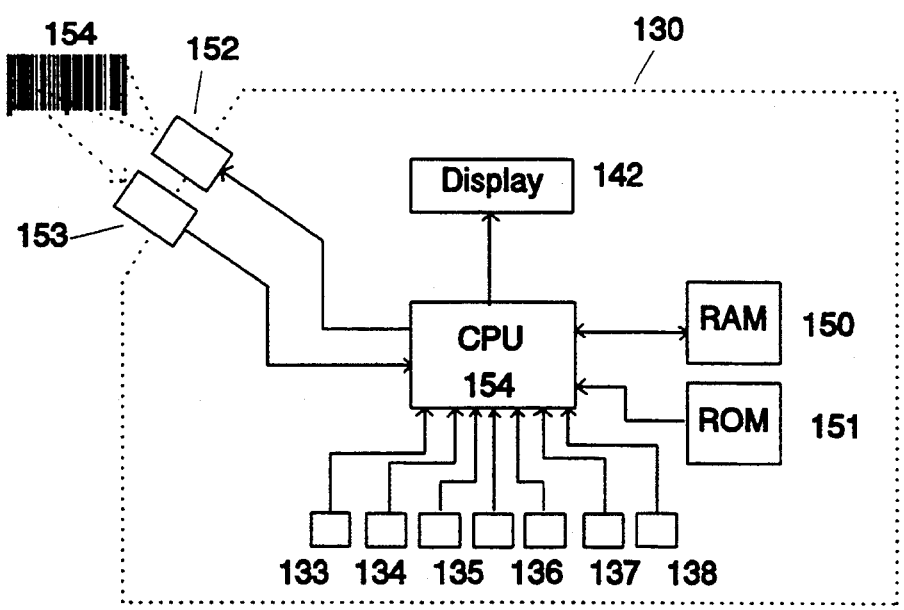
FIG. 8 shows a block diagram of the totalizer shown in FIG. 7.

The encoding of the item price into the shelf label allows for a shopper to carry a calculator-like device which can scan the shelf pricing to store and total the shopper's purchases, as an individual check of the checkout scanner. FIG. 7 shows such a device, and FIG. 8 shows a block diagram of the internal details. Identical reference numbers in the two figures refer to identical features.

This embodiment of the invention is similar to one embodiment of the shopping cart scanner in the present inventor's co-pending application, Ser. No. 07/747,727, filed Aug. 20, 1991, which application formed a part of PCT application PCT/US92/06992, filed Aug. 20, 1992, published as PCT publication WO 93/04449 on Mar. 4, 1993, which publication is incorporated by reference. Unlike the scanner in that application, and unlike the Watson patent cited above, the present invention eliminates the need for an internal database of items and prices, and allows for a simple, calculator-like device which could be easily used by the consumer. The simplicity of the device will lend itself to inexpensive construction, and thus each consumer could purchase one for his or her own use. This would eliminate the concerns about theft and security which were a factor in the more complicated and expensive devices which stored the database of prices internally. Because there is no database, there is no need to worry about updating the data in the database, which itself eliminates an obstacle to the use of the earlier devices.

The totalizer (130) will preferably be built into a small, hand carryable case similar to a pocket calculator. Although described herein as a single-purpose unit, if desired the totalizer could be combined with a calculator, to give the consumer even more capability in the unit.

The front surface of the totalizer (130) will have a display (142) for the customer to view. The display could be of the common LCD or LED sorts used in pocket calculators, or possibly of an incandescent or gas discharge type. Preferably, this display will have separate zones for an item count (139), item price (140) and running total (141), as shown in FIG. 7. The use of these zones will be explained in more detail below.

The totalizer will have built-in or associated with it a device capable of reading the barcodes (154) on the shelf labels. As shown, the totalizer will preferably have a built-in barcode reader (131), which would comprise a light source (152) such as an IR laser diode, and a light detector (153). This will allow the entire device to be self-contained, and will allow the shopper to scan a shelf label by simply passing the corner of the totalizer over the bar code while pressing the "scan" button (131). In the alternative, a simple wand-type barcode reader could be used within the teachings of the invention, such as that described earlier in the shelf-price verifier embodiment of the invention and in the present inventor's copending application cited above, connected to the totalizer by wire or IR.

A number of other buttons would be needed on the totalizer. The exact choice and arrangement of controls would be an obvious design choice by one skilled in the art, depending on the functions desired and the programming developed. If the totalizer is combined with a calculator, then more buttons would be required than if it is just to scan shelf prices and display and total them. The buttons shown in FIGS. 7 and 8 are those which would be included on the preferred embodiment of the totalizer. The operations of the "add" (137), "−" (138), "C/CE" (135), "Total" (134) and up/down (133) buttons will become clear in the explanation below.

Internally, the operation of the totalizer will be controlled by a CPU (154), which can be any of the preferably low-drain VLSI microcomputers available. The programming for the totalizer will reside in Read Only Memory (ROM) (151), which might be incorporated into the same chip as the CPU, or could be a separate chip of any appropriate type. The totalizer will also require a quantity of Random Access Memory (RAM) (150) for storing the scanned information, totals and program variables. This can be any size and type of RAM available, so long as it has enough capacity to store the price and UPC for a reasonable quantity of items (several hundred would suffice), and whatever program elements are required. An ordinary designer skilled in the art would have no trouble determining the memory required from these constraints, the power available, the type of CPU chosen, and other factors.

Not shown is the power source for the totalizer, which could be batteries or solar cells or a combination of the two.

In operation, the shopper will begin by clearing the unit memory by pressing the C/CE key (135). Preferably, a key press of a second or longer would be required in order to reset the totalizer, to minimize the chances of clearing the memory in error.

Then, as the shopper finds an item of interest, he or she will press the scan button (138) and swipe the scan element (131) over the appropriate shelf label. The light source (152) will illuminate the barcode (154), and the reflected light will be detected by photodetector (153). The CPU (154) will translate the scanned barcode into its UPC and price components, and store the information into a temporary storage location in the RAM (150).

The CPU will then display "01" in the "number of items" ("#") zone (139) on the display, and will display the item price in the price zone (140). If the customer wishes to buy more than one of the item, then he or she can increment the item count and price by repeatedly pressing the "+" (137) (or decrement the item count and price with the "−" key (136)).

When the customer decides he or she wants to buy the item, then pressing the "total" key (134) will add the items to the list stored in RAM, and will add the item total (140) to the running total (141).

If the customer changes his or her mind, the CE key (135) will clear the item off the list, and will subtract it from the total, if it has been totalled already.

Once the customer is done shopping, he or she can then use the total displayed on the totalizer to check the total generated by the checkout scanner at the register. If the scanner total does not agree with the totalizer, the up/down arrow key (133) can be used to review the various items on the list in the RAM to compare them with the register tape.

As an additional feature, the totalizer can be programmed to automatically look up an item in the list in RAM and display the item shelf price when a UPC is scanned which does not have the extended price. With this feature, the shelf price of each item can be verified at the checkout register by simply running the totalizer scanner over the UPC on the product itself.

The totalizer can also be adapted to download the list of items and prices in the list in RAM to the checkout register for automatic comparison in accordance with the teachings in the present inventor's co-pending application, cited above. Since the barcode reader (131) in the totalizer has a light source (152), which is preferably an IR laser diode or LED, this same light source could be pulsed or modulated to become a data transmitter, as disclosed in the Tashiro patent cited above. This download could be triggered by an added key, or by a combination of the keys shown in the drawing (perhaps "Scan" and "Total"), or by a specific input on the light receiving element(153). Under this last system, the totalizer would be inserted into a communications slot in the register, and a specific IR signal would be emitted by an IR LED in the slot. This would signal the CPU to begin the download of the list, using the IR light element (152) as a transmitter.

Use of the Invention in the Enforcement Process

Another user group for the invention will be the state or county inspectors charged with enforcing a scanner accuracy law. Of course, the inspector could simply download the store's UPC database and proceed exactly like a store employee, as explained above. That would, however, leave the process open to manipulation by a dishonest store, who could arrange to download a database with the (incorrect) shelf prices instead of the scanner prices. An independent check would be preferable. There are several ways this could be done.

The inspector arrives at the store unannounced. Since the UPC is, after all, Universal and not store-dependent, he can have a stack of 3×5 cards ready, each bearing a randomly selected UPC for a product. These cards are run through a checkout scanner at the store, as if the items themselves had been presented for purchase. The register produces a tape giving the scanned price for all of these items.

At this point, the inspector notes the prices on the cards, or works from the register tape to enter the prices and UPC's into a computer to form a database which resembles the one in the store's computer. This is downloaded into a verification unit. The inspector then uses the verification unit to scan the shelf labels, either looking specifically for the items scanned the previous day, or simply for representative aisles in the store. The verification unit will do the shelf scan and lookup as described above. This does allow the store time to change the shelf labels, if they were so inclined and if the there is too long a time delay between the checkout register scan and data entry into the verification unit and the shelf scan to check the prices.

Figure 6:
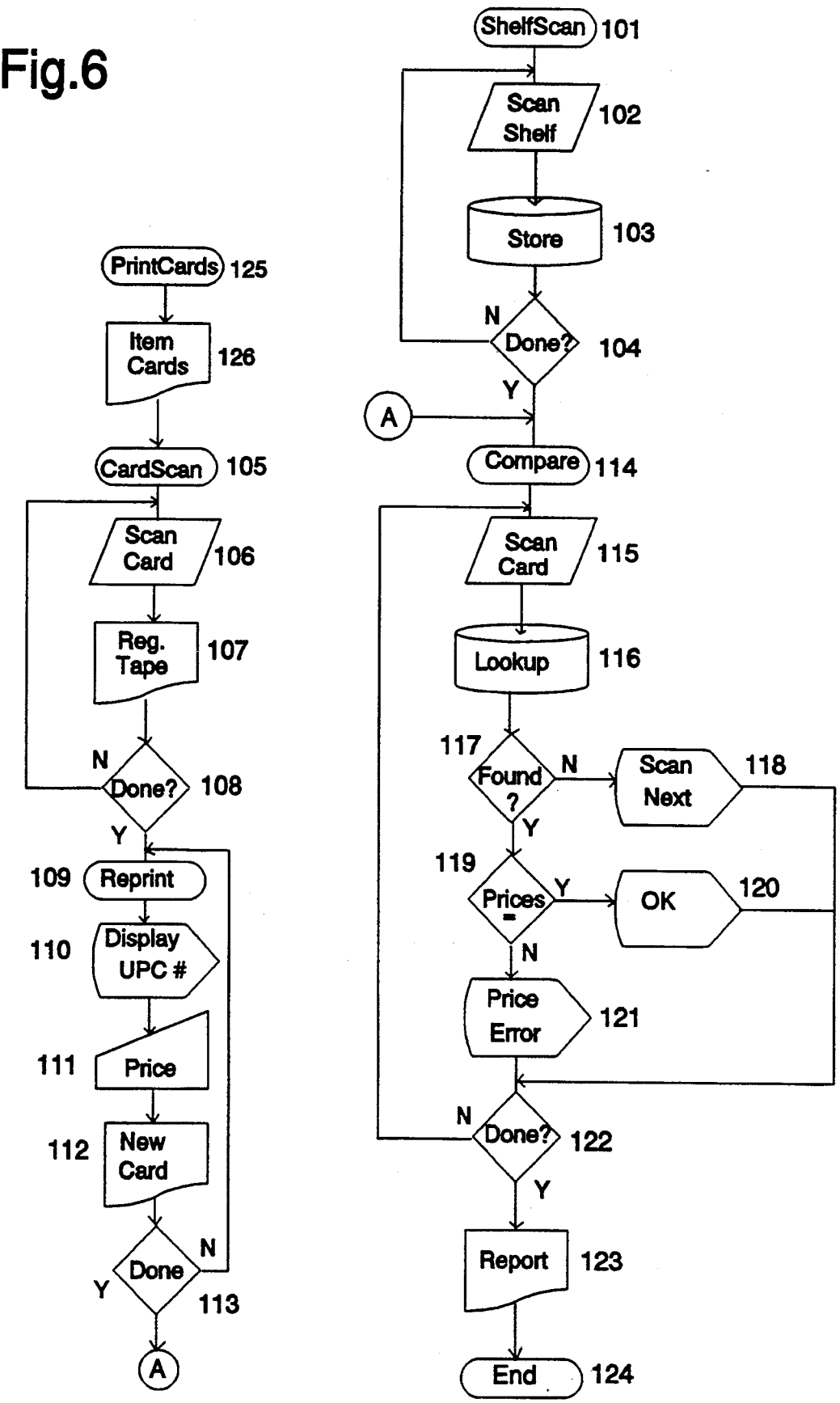
FIG. 6 shows a flowchart of a method of verification of shelf pricing by an inspector.

Alternatively, with appropriate modifications to the software in the portable verification unit, the above procedure can be reversed and the entire inspection done on one visit (see FIG. 6 for a flowchart of this procedure).

In this method, the inspector would print a quantity of 3×5 cards (125/126) before he arrives at the store. Bringing the cards and the verification unit to the store, he would then (101) build a database of "correct" prices in the unit by scanning a number of shelf price labels (102)–(104) (either randomly chosen, or looking for the items preselected on the 3×5 cards). The 3×5 cards are scanned on the checkout register scanner and a register tape is produced (105)–(108), and the cards, register tape and verification unit with its database created from the shelf labels can then be taken back to the office. Preferably, the computer at the office which printed the cards will be programmed to display the UPC's from the cards (110), for an operator to enter the prices (111) from the register tape. The computer will then print new cards (112) with the extended UPC (item ID and price), simulating shelf labels of the form of the invention. Then (114)–(122), by scanning the "shelf labels" printed in the inspector's office (115), the verification unit will automatically flag all cases where the register differed from the database created by scanning the real shelf labels in the store (119) & (121). If a card had not been scanned into the database, the inspector is instructed to proceed to the next card (117)–(118). Finally, a report on the process (123) can be printed.

Of course, not every store sells every item, so it is possible that some of the pre-printed test items will not be in the store database. By the same token, unless the inspector takes the time to find each item represented in the pre-printed list, not every item on the list (card) will be scanned. However, if the previously scanned items were sufficiently numerous and truly random, any aisle should have a large enough number to make up a reasonable sample for enforcement purposes. Statistical analysis can be done to determine the minimum number of test items and scanned items to form a sufficiently accurate test for enforcement purposes.

By setting the print mode to "no print", the inspector can just get an indication of errors and a summary printout, or he can set to "print on price error" and specifically print out corrected labels to use as evidence, along with the erroneous shelf labels. Or, he can set the printer to "print always" to get a permanent record of the items checked, good and bad.

This method has been described above in terms of the portable verification unit hardware. It will be understood that the totalizer unit may also be used in the enforcement method. The inspector could use the totalizer to store the UPC numbers and prices for selected items, then use the 3×5 cards with bar codes as described above to generate a register tape at the checkout scanner for comparison purposes. The inspector will then manually compare the items and prices from the totalizer with the items and prices on the register tape by recalling the list in the totalizer one item at a time using the up/down control, or by scanning the cards with the totalizer for lookup.

To make the checking and enforcement process easier, the store's checkout registers could easily be programmed to print the UPC number on the register tape, in addition to or replacing the verbal item description.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

I claim:

1. A method of shelf price verification for a store of the type utilizing checkout scanners and shelf pricing, comprising the steps of:
   a) placing shelf price labels for each of a plurality of items in the store, each label having at least an item identification printed in barcoded form, and a price presented in both barcoded and human-readable form;
   b) scanning the shelf label, reading at least the item identification and shelf price;
   c) looking up an item record from a store checkout scanner price database using the item identification, the item record containing at least the price for the item which would be used by the store checkout scanner;
   d) comparing the shelf price from the scanned label to the price from the store checkout scanner price database;
   e) if the shelf price from the scanned label is not equal to the price from the store checkout scanner price database, presenting an indication of a price error to an operator.

2. The method of claim 1, further comprising, in step "e" thereof, printing a new shelf price label containing at least the item identification printed in barcoded form, and the correct price from the store price database presented in both barcoded and human-readable form.

3. The method of claim 1 in which the item identification in barcoded form printed on the shelf price label is the UPC barcode for the item.

4. The method of claim 3 in which the UPC barcode for the item is extended to also barcode the price of the item.

5. A portable shelf price verification unit, for use in a system wherein a plurality of items in a store are identified with shelf price labels, each label having at least an item identification printed in barcoded form, and a price presented in both barcoded and human-readable form, comprising:

a) scanner means for reading at least the item identification and shelf price from the barcode on the shelf price label;

b) memory means for storing at least the scanned item identification and the scanned shelf price from the barcode on the shelf price label;

c) database means for storing a plurality of item records, each record representing an item and containing at least an item identification and store checkout scanner price;

d) indicator means for communicating with the operator of the verification unit, e) processor means for controlling the scanner means, memory means, indicator means and database means, such that when the scanner means has scanned a shelf price label, the processor means loads the item identification into the memory means, looks up the item identification in the memory means in the database means, retrieves the associated item record for the item identified by the item identification, and compares the scanned shelf price and the price from the item record, and, if the shelf price and item record prices are not equal, provides a price error indication to the operator of the verification unit using the indicator means.

6. The verification unit of claim 5, further comprising a printer, capable of printing the barcode and human-readable information on a shelf price label, operatively connected to the processor means such that when the shelf price and item record prices are not equal the processor means commands the printer to print a new shelf price label having at least the item identification printed in barcoded form, and the item record price presented in both barcoded and human-readable form.

7. The verification unit of claim 5 in which the item identification in barcoded form printed on the shelf price label is the UPC barcode for the item.

8. The verification unit of claim 7 in which the UPC barcode for the item is extended to also include a barcode for the price of the item.

9. The verification unit of claim 5 in which the price error indication is an audible alarm.

10. The verification unit of claim 5 in which the price error indication is a visual display.

11. The verification unit of claim 5 in which the database means is a mass storage device located in the portable verification unit.

12. The verification unit of claim 11 in which the mass storage device is a magnetic disk drive.

13. The verification unit of claim 11 in which the mass storage device is an optical disk drive.

14. The verification unit of claim 11 in which the mass storage device is solid state Random Access Memory 15. The verification unit of claim 11 in which the portable verification unit further comprises input/output means for communicating with a store computer, whereby the database of item records can be downloaded from the store computer to the database means of the portable verification unit.

16. The verification unit of claim 5 in which the store has a store computer controlling a plurality of checkout registers for scanning purchases by consumers, the database means is the database associated with the store computer which controls the checkout registers, and the portable verification unit further comprises a remote data link between the portable verification unit and the store computer.

17. The verification unit of claim 16 in which the remote data link uses radio frequency (RF) communications.

18. The verification unit of claim 16 in which the remote data link uses infrared (IR) communications.

19. The verification unit of claim 5 in which the indicator means also indicates when the shelf price and item record price are equal.

* * * * *